US011303750B2

(12) United States Patent
Chavez et al.

(10) Patent No.: US 11,303,750 B2
(45) Date of Patent: Apr. 12, 2022

(54) INTELLIGENT INTERACTIVE VOICE RESPONSE (IVR) NAVIGATOR

(71) Applicant: Avaya Management L.P., Santa Clara, CA (US)

(72) Inventors: David Chavez, Broomfield, CO (US); John A. Young, Buntingford (GB)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/917,073

(22) Filed: Jun. 30, 2020

(65) Prior Publication Data
US 2021/0409542 A1 Dec. 30, 2021

(51) Int. Cl.
*H04M 3/51* (2006.01)
*H04L 12/58* (2006.01)
*G06N 20/00* (2019.01)
*H04L 51/02* (2022.01)

(52) U.S. Cl.
CPC .......... *H04M 3/5166* (2013.01); *H04L 51/02* (2013.01); *H04M 3/5175* (2013.01); *G06N 20/00* (2019.01)

(58) Field of Classification Search
CPC ... H04M 3/5166; H04M 3/5175; H04L 51/02; G06N 20/00
USPC ................. 704/275; 379/88.01, 242, 265.09, 379/221.08, 207.15, 88.19, 88.11
See application file for complete search history.

(56) References Cited

U.S. PATENT DOCUMENTS

| 8,160,614 | B2 | 4/2012 | Shaffer et al. |
| 9,420,097 | B2 | 8/2016 | Perotti et al. |
| 9,614,964 | B2 | 4/2017 | Stepanian |
| 2002/0006787 | A1 | 1/2002 | Darby |
| 2008/0080368 | A1* | 4/2008 | Fan ...................... H04L 43/0817 370/229 |
| 2010/0306072 | A1* | 12/2010 | Ford, Jr. .............. G06Q 20/202 705/21 |
| 2014/0314225 | A1* | 10/2014 | Riahi ...................... H04L 51/02 379/265.09 |

OTHER PUBLICATIONS

"Cyara Website,"Cyara, 2019, 22 pages [retrieved online from; cyara.com].
DevCookHouse "Google Assitant Haircut Appointment Call |Google I/O 18," YouTube, May 8, 2018, 18 pages [retrieved online from: https://www.youtube.com/watch?v=yDI5oVn0RgM].

* cited by examiner

*Primary Examiner* — Thjuan K Addy
(74) *Attorney, Agent, or Firm* — Sheridan Ross P.C.

(57) ABSTRACT

A method and system are described that interact with a self-service system on behalf of a customer and without requiring a presence of the customer during the interactions. An illustrative method includes receiving one or more inputs from a customer, where the one or more inputs define a desired action to take on behalf of the customer with the self-service system in the absence of the customer's presence, obtaining contact information for the self-service system, using the contact information to automatically establish a communication session with the self-service system, receiving a prompt from the self-service system, and performing the desired action as a response to the prompt, where the desired action is performed during the communication session on behalf of the customer and in the absence of the customer's presence.

20 Claims, 8 Drawing Sheets

INTELLIGENT INTERACTIVE VOICE RESPONSE (IVR) NAVIGATOR

FIELD

Embodiments of the present disclosure relate generally to communication methods and specifically to communication methods used to facilitate interactions with automated response systems.

BACKGROUND

Interactions between a customer and contact center can consume an inordinate amount of time for the customer. The customer will typically navigate a contact center Interactive Voice Response (IVR) menu system and then routinely need to wait in queue to speak with a live agent. The amount of time spent navigating the IVR and waiting for a live agent can lead to significant customer frustration.

BRIEF SUMMARY

Embodiments of the present disclosure described herein fundamentally improve the customer's experience by providing an ability to automate the initial navigational steps described above. An Intelligent IVR Navigator is described herein that can either automatically, and without customer input, conduct the desired interaction on behalf of the customer or involve the customer once an agent has become available for the interaction.

The Intelligent IVR Navigator may be designed to leverage automation technology to perform a wide range of interactions with a contact center on behalf of an end user. This saves significant time and avoids potential aggravation for the end user because they no longer need to spend time navigating through complicated IVR menus only to then wait for extended periods of time in queue for an agent. Utilization of an Intelligent IVR Navigator as described herein may result in a far improved customer experience for the end user and allows the individual to spend their time on other more productive activities.

The Intelligent IVR Navigator is intended to save significant time and effort for a consumer (e.g., the "customer") by using automation technologies to conduct customer-to-business (C2B) interactions on the customer's behalf Although an abundance of automated Personal Assistant capabilities exist in the marketplace, the proposed Intelligent IVR Navigator specifically targets the intelligent automation of interactions between customer and contact center IVR system. Embodiments of the present disclosure make use of Artificial Intelligence (AI) technologies to dynamically interpret IVR menu structures and intelligently interact with the IVR menu in real-time on behalf of the customer. An accommodation can also made to allow a business to securely publish its IVR menu structure in advance so that the Intelligent IVR Navigator can assimilate it ahead of time.

One embodiment of the present disclosure may utilize an Intelligent IVR Navigator deployment as part of a personal assistant entity. The personal assistant entity would be configured to initially interact with a customer in order to receive instructions. It would then utilize the Intelligent IVR Navigator to interact with a selected contact center IVR system on behalf of the customer. In an illustrative but non-limiting use case, the customer might rely upon the personal assistant to intelligently traverse a contact center's IVR, wait in queue (on behalf of the customer), and then establish a callback time for the customer. In this way, the customer is spared the time needed to navigate the IVR system and then wait in queue. The Intelligent IVR Navigator may be configured to utilize AI components. NLP (Natural Language Processing) and Deep Learning (Neural Network-based) technologies are examples of AI components that may be leveraged by the Intelligent IVR Navigator to seamlessly and intelligently interact with automated systems of a contact center (e.g., IVR solutions, chatbots, etc.). NLP technology enables the use of multiple communication modalities (e.g., voice, text, etc.) between the Intelligent IVR Navigator and counter parties. A Deep Learning model may be used to interpret the context of complex C2B interactions that can occur within a contact center environment and to support increased levels of automated decision-making.

Training of an AI component (e.g., a Deep Learning model) can be accomplished by using a variety of different methods. A representative method may involve using an IVR platform, the model to be trained, and three training datasets as input to the model. Additional test datasets may also be used once the model has undergone initial training. The first training dataset (e.g., IVR-templates) may include different multi-level IVR menus of the type that are routinely used by businesses as the self-service front-end to their contact centers. The second training dataset (e.g., IVR-menu-flows) may include the sequences of IVR menu states that will be encountered by a caller during their self-service interaction with the IVR system. The third training dataset (e.g., IVR-Input) may include selection data that is supplied to the IVR system (traditionally by the customer) in order to advance each self-service interaction. Separate training sequences may then be executed by submitting IVR-Input data to the Intelligent IVR Navigator in the form of a Dual-Tone Multi-Frequency (DTMF) entry and/or spoken voice. Agent interaction may also be used during the training process to provide feedback about the relative success of IVR navigation attempts. The model would then undergo continual training while in production (e.g., while in use by the Intelligent IVR Navigator), based on feedback that is obtained directly from the customer. Ongoing training of the Intelligent IVR Navigator may be used to improve performance of the Intelligent IVR Navigator in a number of respects. For instance, if multiple customers are using the Intelligent IVR Navigator to conduct transactions with a single entity (e.g., a common IVR system), then the results of those transactions can be used to update training data associated with that entity and the entity's IVR system. Alternatively or additionally, interactions of a customer with the Intelligent IVR Navigator can be used to improve performance of the Intelligent IVR Navigator for other customers, meaning that the Intelligent IVR Navigator can be trained by interactions with one customer for the benefit of another customer. Alternatively or additionally, interactions between the Intelligent IVR Navigator and one entity's IVR system may be used to train the Intelligent IVR Navigator to interact more efficiently with other IVR systems of other entities.

In some embodiments, the Intelligent IVR Navigator may be configured to interact directly with customers and their communication devices. In some embodiments, it may also be possible to programmatically interface the Intelligent IVR Navigator with a customer's Personal Assistant, which means that the Personal Assistant (e.g., Siri, Alexa, etc.) used and configured by the customer may be further configured to interface with the Intelligent IVR Navigator on behalf of the customer and based on preferences defined by the customer with the Personal Assistant.

Embodiments of the present disclosure contemplate deployment of the Intelligent IVR Navigator within a mobile network core or cloud infrastructure. The customer can invoke the service from their mobile device by using a web link from their mobile browser or by using a mobile application that is installed on their mobile device. It is anticipated that use of the service offered by the Intelligent IVR Navigator can improve the customer experience by reducing the amount of time and user friction that is experienced during a typical C2B interaction.

It is, therefore, one aspect of the present disclosure to provide an Intelligent IVR Navigator with the ability to automatically navigate/traverse and intelligently interact with contact center automated system (e.g., IVR systems, chatbots, etc.) in real-time on behalf of a customer.

It is another aspect of the present disclosure to enable the Intelligent IVR Navigator to learn from prior customer behaviors and thereby continually improve/personalize the customer's profile. The decision-making effectiveness of the present disclosure for a customer will therefore continually improve.

A non-limiting use case may help further provide an understanding of the capabilities of the proposed Intelligent IVR Navigator. In this particular use case, a customer may seek customer service/product support via the Intelligent IVR Navigator. The customer (Bob) would like to contact a business (ABC Inc.) in order to obtain support for his new home electronics widget (XYZ). Since Bob previously registered with the Intelligent IVR Navigator, Bob uses the mobile browser on his smartphone to access the Intelligent IVR Navigator. Because the Intelligent IVR Navigator is available as a web application, access to the Intelligent IVR Navigator is provided to Bob via his mobile browser.

The Intelligent IVR Navigator may prompt Bob to enter a text description of his request, or to verbally state his request. Depending on the nature of Bob's request, he is also prompted to specify a preferred contact time in case a callback is warranted. In response to the prompt, Bob states that he would like support from ABC Inc. because his new widget XYZ will not connect to his home Wi-Fi. He also states that a callback time of 2:00 pm or later that day will be fine if necessary. Bob submits the request and then returns to his previous work activities. Options may be presented to Bob by the Intelligent IVR Navigator based on the Intelligent IVR Navigator's existing knowledge of the IVR menu structure for ABC Inc. In particular, the Intelligent IVR Navigator may present Bob with a list of options via the mobile browser that correspond to IVR menu options the Intelligent IVR Navigator will encounter. Such options may include product name options, product serial number options, trouble description, etc.

Upon receiving the request and additional parameters defined by Bob, the Intelligent IVR Navigator retrieves the customer support telephone number for ABC Inc. from their website (or from Bob's profile if he has previously interacted with ABC Inc.). With the customer support telephone number retrieved, the Intelligent IVR Navigator initiates a call to the ABC Inc. customer support contact number. The Intelligent IVR Navigator is presented with a list of IVR menu options. Based on Bob's previous inputs, the Intelligent IVR Navigator selects the option for "Customer Service" and then selects "Home Electronics" rather than "Home Appliances" or "Garden Furniture" from the IVR menu. At the next stage of the IVR menu, the Intelligent IVR Navigator then selects widget XYZ from a long list of different product names/types. The Intelligent IVR Navigator may then select "Network Connectivity Problems" rather than "Hardware Problems", "Software Problems" or "Configuration Problems."

The Intelligent IVR Navigator is then presented with wait treatment while waiting for a customer service representative. After a period of time has passed (e.g., after 10 minutes has elapsed), a contact center announcement asks whether a callback is desired given that the expected wait time is now 45 minutes. Again, based on Bob's previous inputs, the Intelligent IVR Navigator may select the callback option and specify the time and date that Bob had initially stated (e.g., 2:00 pm). If that time is unavailable, the Intelligent IVR Navigator may either prompts Bob for an alternate time by sending a notification to his mobile phone, or the Intelligent IVR Navigator may check Bob's calendar for an alternate time. An alternate time is then specified for the callback. The options for determining alternate callback times may be defined within Bob's personal profile.

After requesting the callback for Bob, the Intelligent IVR Navigator may disconnect from the call with ABC Inc. and send a message (e.g., an SMS message or email message) to Bob. The message may indicate that Bob will be receiving a call from ABC Inc. customer service at or around the specified time (e.g., 2:00 pm or alternate). Bob then receives a call from ABC Inc. customer service at the specified time later that day.

As used herein, an AI model may correspond to a dataset that is useable in a neural network, a deep learning system, a natural language processing system, or any other type of AI component and that has been trained by one or more datasets. An AI model may describe behaviors of an automated response system (e.g., an IVR system, a customer service chatbot, etc.). The AI model may be stored as a model data file or any other data structure that is useable within an AI component.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory.

Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

Figure 1:
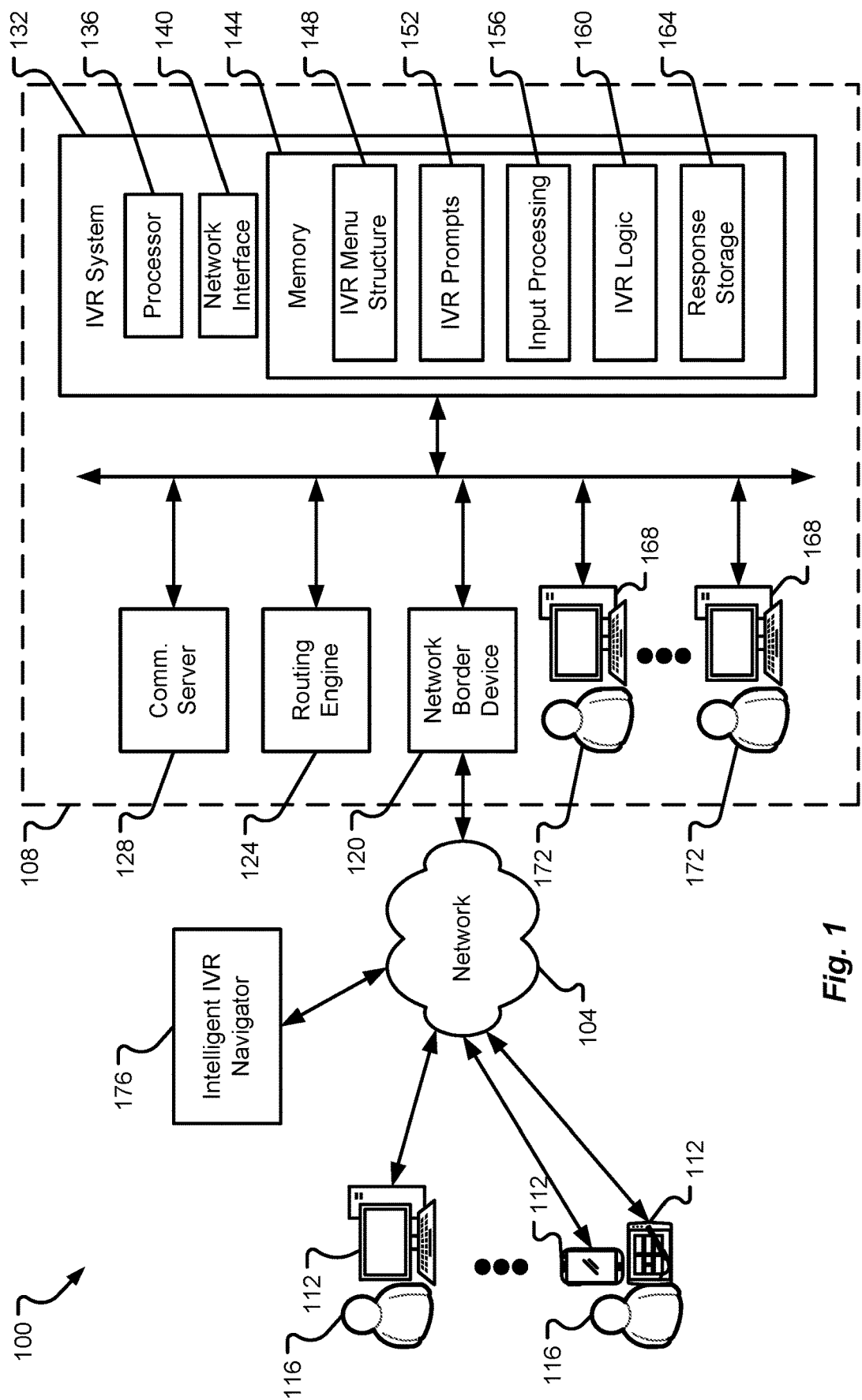
FIG. 1 is a block diagram illustrating a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for enabling an Intelligent IVR Navigator to act on behalf of a customer with automated resources of a contact center. The automated resources with which the Intelligent IVR Navigator interacts may include an IVR system, a chatbot, or any number of other automated/self-service systems offered by a contact center to a customer. While various embodiments will be described in connection with an Intelligent IVR Navigator interacting with an IVR system of a contact center, it should be appreciated that embodiments of the present disclosure are not so limited. Rather, an Intelligent IVR Navigator may be configured to interact with non-voice systems provided by a contact center. As a specific but non-limiting example, an Intelligent IVR Navigator may be configured to interact with a chatbot on behalf of a customer without departing from the scope of the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. While a single instance of a contact center 108 is depicted in FIG. 1, it should be appreciated that the system 100 may include any number of contact centers 108 and each contact center 108 may be configured provide services to the customer 116 in a variety of ways. For instance, some contact centers 108 may provide self-service capabilities to a customer 116 by way of an IVR system 132 whereas other contact centers 108 may provide self-service capabilities to a customer 116 by way of an IVR system 132 and chatbot. The illustration of a single contact center 108 is for ease of discussion and should not be construed as limiting embodiments described herein.

The customer 116 may correspond to a user or person that interacts with their customer communication device 112 to communicate with a resource of the contact center 108. Specifically, the contact center 108 may include a number of resources that facilitate customer 116 interactions via one or multiple communication channels that are presented to and maintained for use by the customer 116. As shown in FIG. 1, a customer 116 may utilize one or multiple customer communication devices 112 to interact with the contact center 108. Moreover, embodiments of the present disclosure contemplate that the customer 116 may use multiple different customer communication devices 112 to communicate via a single communication channel. As a non-limiting example, a customer 116 may login to a web-based portal or authenticate themselves with a particular chat channel and then utilize the web-based portal or chat channel to communicate with any one of their customer communication devices 112. A customer communication device 112 may also be used by the customer 116 to interact with the Intelligent IVR Navigator 176. Based on interactions with the Intelligent IVR Navigator 176, the customer 116 may invoke the Intelligent IVR Navigator 176 to interact with the contact center 108 on behalf of the customer 116. In some embodiments, the Intelligent IVR Navigator 176 may be configured to interact with a number of different contact center 108 on behalf of a single customer 116. Alternatively or additionally, the Intelligent IVR Navigator 176 may be configured to interact with one or multiple contact centers 108 on behalf of multiple different customers 116.

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These customer communication devices 112 may also have any of a variety of applications, including for example, a database client and/or server applications, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 172, a chatbot, or an IVR system 132 to interact with a customer 116 via a communication channel established between the customer communication device 112 and the contact center 108. In particular, the contact center 108 is shown to include a network border device 120 and a number of servers 124, 128, 132 that enable functionality of the contact center 108. The network border device 120 may correspond to one or a number of devices that establish and maintain information security for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that safely pass through the network border device 120 may be transferred to the communication server 128 or routing engine 124 for further analysis and processing (e.g., for inclusion with a particular conversation, for assigning/forwarding to a particular contact center agent 172, for forwarding to the IVR system 132, for forwarding to a particular chatbot, etc.).

In some embodiments, each server of the contact center 108 may be configured to perform a particular task or a set of tasks specific to supporting functions of the contact center 108. For instance, the routing engine 124 may correspond to a server or set of servers that are configured to receive messages from the network border device 120 and make routing decisions for the message(s) within the contact center 108. The communication server 128 may correspond to a single server or a set of servers that are configured to establish and maintain a communication channel between customers 116 and the contact center 108. In some embodiments, the routing engine 124 and communication server 128 may work in cooperation to ensure that an appropriate agent 172 or set of agents 172 are assigned to a particular communication channel for purposes of servicing/addressing contacts initiated by customers 116 of the contact center 108. Alternatively or additionally, the routing engine 124 and communication server 128 may be configured to cooperate and connect a customer communication device 112 with the IVR system 132 of the contact center 108. By connecting the customer communication device 112 with the IVR system 132, the customer 116 may be allowed to interact with the IVR system 132 and perform self-service operations that do not necessarily include a human agent 172. The routing engine 124 and communication server 128, in a similar way, may also be configured to connect the Intelligent IVR Navigator 176 to the IVR system 132. Although not depicted, the contact center 108 may also include a chatbot that is connectable to a customer communication device 112 and/or the Intelligent IVR Navigator 176.

Specifically, but without limitation, the routing engine 124 may be configured to determine whether an agent 172 or automated system (e.g., IVR system 132 or chatbot) should be assigned to a particular communication channel for purposes of answering a customer's 116 question and/or for purposes of providing a service to the customer 116. Likewise, the routing engine 124 may be configured to determine that an Intelligent IVR Navigator 176 should be assigned to an agent 172 or automated system. If appropriate, the routing engine 124 may provide appropriate signaling to an agent's communication device 168 that enables the agent's communication device 168 to connect with the communication channel over which the customer 116 is communicating and to enable the agent 172 to view messages sent by the customer's communication device 112, which are eventually assigned to and posted on the appropriate communication channel. Alternatively or additionally, the routing engine 124 may provide appropriate signaling to the communication server 128 to establish/negotiate a communication path between the automated system of the contact center 108 and the customer communication device 112 or Intelligent IVR Navigator 176. Even more specifically, the communication server 128 may establish and maintain a digital chat communication channel that is presented to the customer's communication device 112 and which enables the customer 116 to send chat messages to the contact center 108 when desired. Alternatively or additionally, as will be described in further detail herein, the routing engine 124 may connect an automated system (e.g., the IVR system 132 or a chatbot) to the communication channel to help service the customer's 116 needs by interacting with the Intelligent IVR Navigator 176.

It should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. In addition to supporting text-based communications, the communication server 128 may also be configured to support non-text-based communications such as voice communications, video communications, and the like.

Because the Intelligent IVR Navigator 176 may be required to communicate with the communication server 128 in addition to interacting with the IVR system 132, the Intelligent IVR Navigator 176 may be configured to support any or all of the communication protocols supported by the communication server 128. In other words, the Intelligent IVR Navigator 176 may be configured to operate using a text-based, voice-based, or video-based communication protocol.

Another server or set of servers that may be provided in the contact center 108 may be configured to provide an IVR system 132 as part of a customer 116 self-service option. The IVR system 132 may be configured as one or multiple servers to provide an IVR experience to the customer 116. In some embodiments, the IVR system 132 may include a processor 136, network interface 140, and memory 144. The memory 144 may be configured to store instructions for executing an IVR function as well as data for providing IVR functions. Although not depicted, the memory 144 may also store a chatbot and other components to support text-based customer 116 self-service options.

While certain components are depicted as being included in the IVR system 132, it should be appreciated that such components may be provided in any other server or set of servers in the contact center 108. For instance, components of the IVR system 132 may be provided in a routing engine 124 and/or communication server 128, or vice versa. Further still, embodiments of the present disclosure contemplate a single server that is provided with all capabilities of the routing engine 124, the communication server 128, and the IVR system 132.

The processor 136 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The network interface 140 may be configured to enable the IVR system 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions that are executable by the processor 136 and that ultimately provide functionality of the IVR system 132 described herein. The memory 144 may also be configured to store data or information that is useable or capable of being called by the instructions stored in memory 144. The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the IVR system 132, it should be appreciated that the memory 144 may correspond to a memory device, database, or appliance that is external to the IVR system 132.

Illustratively, the memory 144 is shown to store IVR logic 160 for execution by the processor 136. The IVR logic 160 may access the IVR menu structure 148, IVR prompts 152, and input processing 156 as part of providing an IVR experience to the customer 116 and/or the Intelligent IVR Navigator 176. The IVR logic 160 may correspond to executable instructions (e.g., an IVR application) that provides prerecorded IVR prompts 152 based on customer 116 inputs or Intelligent IVR Navigator 176 inputs. In some embodiments, the IVR logic 160 may utilize the input processing 156 to interpret inputs received from a customer communication device 112 or Intelligent IVR Navigator 176. As a non-limiting example, such inputs may include DTMF inputs, voice inputs, or combinations thereof. The IVR logic 160 may leverage any type of computing language or script (e.g., voice Extensible Markup Language (VoiceXML), Hypertext Markup Language (HTML), etc.) to determine a next action for the IVR system 132 to take in response to an input received from a customer 116 or Intelligent IVR Navigator 176.

Based on the inputs received, the IVR logic 160 may then traverse the IVR menu structure 148 to provide additional options to the customer 116 or Intelligent IVR Navigator 176. The additional options provided to the customer 116 or Intelligent IVR Navigator 176 may be obtained from the IVR prompts 152. As additional responses are received from the customer 116 or Intelligent IVR Navigator 176, the IVR logic 160 may continue processing additional inputs with the input processing 156 and then determine additional actions, which may include further traversing the IVR menu structure 148, connecting a human agent 172 with the customer 116 or Intelligent IVR Navigator 176, scheduling a callback for the customer 116, etc. As inputs or responses are received from the customer 116 or Intelligent IVR Navigator 176, the responses and prompts that lead to the responses may also be stored in a response storage 164 location of memory. The responses stored within the response storage 164 may later be provided to the Intelligent IVR Navigator 176 as part of training an AI model in the Intelligent IVR Navigator 176 and generally improving the operation of the Intelligent IVR Navigator 176. In other words, the responses stored in the response storage 164 can be provided as feedback or a training dataset to help train operations and behaviors of the Intelligent IVR Navigator 176.

Although not depicted, a chatbot engine may be provided in addition to or in lieu of the IVR system 132. A chatbot engine may correspond to a set of processor-executable instructions (e.g., a finite instruction set with defined inputs, variables, and outputs). In some embodiments, the chatbot engine may correspond to an Artificial Intelligence (AI) component of the contact center 108 that is executed by the processor 136. The chatbot engine, in some embodiments, may utilize one or more conversation models, which may be in the form of an artificial neural network, for recognizing and responding to messages transmitted by a customer 116 or Intelligent IVR Navigator 176 over a communication channel supported by the communication server 128.

Figure 2:
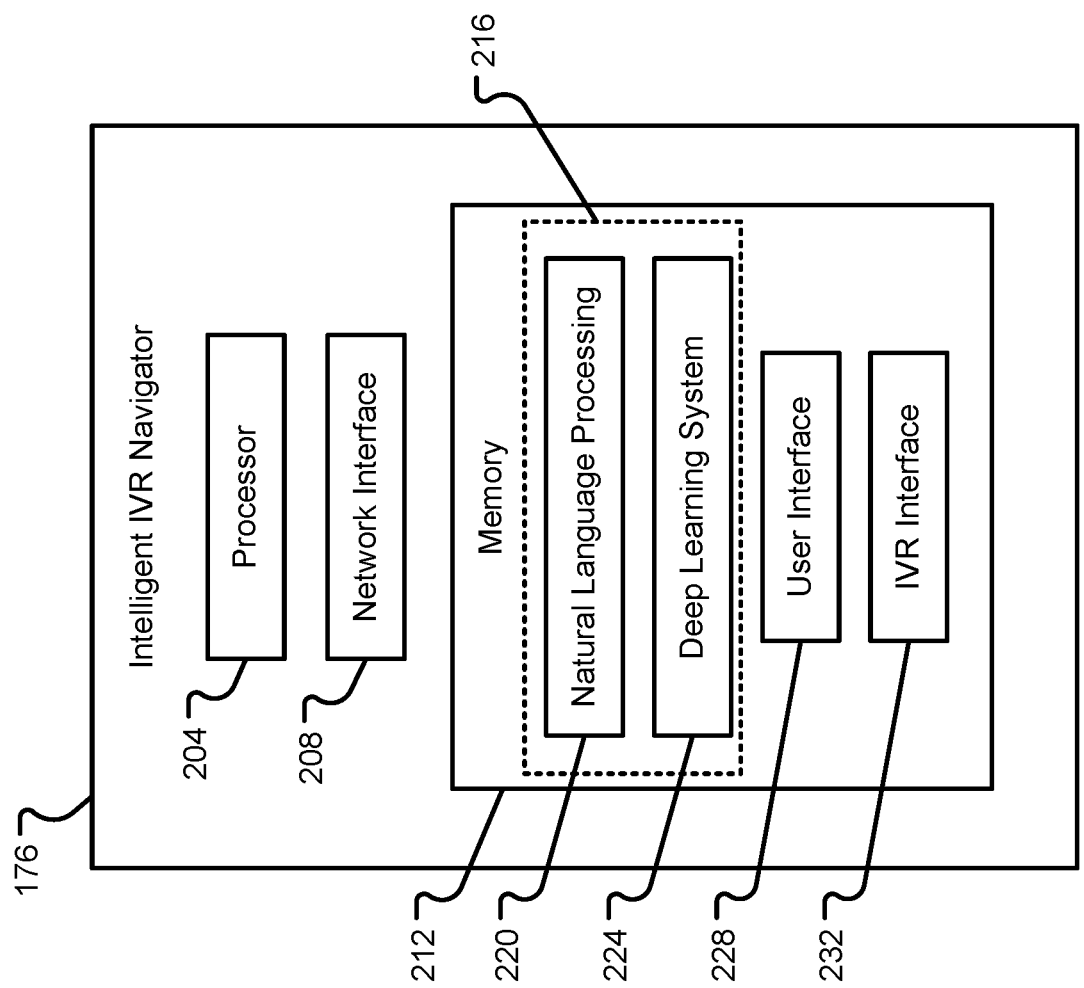
FIG. 2 is a block diagram depicting an Intelligent IVR Navigator in accordance with at least some embodiments of the present disclosure.

Further details of an Intelligent IVR Navigator 176 and its capabilities will now be described with reference to FIGS. 2 and 3. As previously discussed, the Intelligent IVR Navigator 176 may utilize machine learning may have access to training data to initially train behaviors of the Intelligent IVR Navigator 176. The Intelligent IVR Navigator 176 may also be configured to learn from further interactions based on feedback, which may be provided in an automated fashion (e.g., via a recursive learning neural network) and/or a human-provided fashion (e.g., by a human agent 172, a customer 116, etc. confirming or denying that a particular response prepared by the Intelligent IVR Navigator 176 was appropriate for a particular scenario).

The Intelligent IVR Navigator 176 may be provided by one or many servers and the server(s) may include a processor 204, a network interface 208, and memory 212. The processor 204 may be similar or identical to processor 136. The network interface 208 may be similar or identical to network interface 140. The memory 212 may be similar or identical to memory 144. As discussed above, the Intelligent IVR Navigator 176 may be configured to interact with a plurality of different contact centers 108 owned and operated by a plurality of different entities. It should be appreciated, however, that an Intelligent IVR Navigator 176 may be provided within a contact center 108 for the purpose of enabling automated interactions with that contact center 108 only.

Because the Intelligent IVR Navigator 176 may be configured to perform actions at an automated system of a contact center 108 on behalf of a customer 116 and without customer 116 input while those interactions are occurring, the Intelligent IVR Navigator 176 may be provided with a user interface 228 and an IVR interface 232. The user interface 228 may be configured to provide a customer 116 with access to the Intelligent IVR Navigator 176, to present the customer 116 with options for operating the Intelligent IVR Navigator 176, and to provide messages/notifications to the customer 116 as appropriate. In other words, the user interface 228 may be responsible for presenting the Intelligent IVR Navigator 176 to the customer 112 via interactions with a customer communication device 112. Conversely, the IVR interface 232 may be configured to retrieve information from an IVR system 132, provide inputs to the IVR system 132, retrieve training data from the IVR system 132, and manage any other interactions between the Intelligent IVR Navigator 176 and the automated service of the contact center 108.

In addition to the interfaces, the memory 212 may also be configured to store AI components 216, which may be executable by the processor 204. Illustrative AI components 216 are shown to include a natural language processing 220 component and a deep learning system 224. Some or all of the AI components 216 may be provided as a neural network or collection of neural networks configured to perform functions of the Intelligent IVR Navigator 176 as described herein. While described primarily as AI components 216, it should be appreciated that certain aspects of the natural language processing 220 and/or deep learning system 224 may be provided as executable instructions. Alternatively or additionally, other functions of the Intelligent IVR Navigator 176 may be provided as executable instructions rather than being provided as an AI component 216. Utilization of an AI component 216, however, may enable the Intelligent IVR Navigator 176 to learn from behaviors and interactions with one contact center 108 for purposes of improving interactions with other contact centers 108. Likewise, the AI components 216 may be trained and functions thereof improved with respect to customer 116 interactions and such improvements may be made for one customer 116 based on previous interactions with other customers 116.

Figure 3:
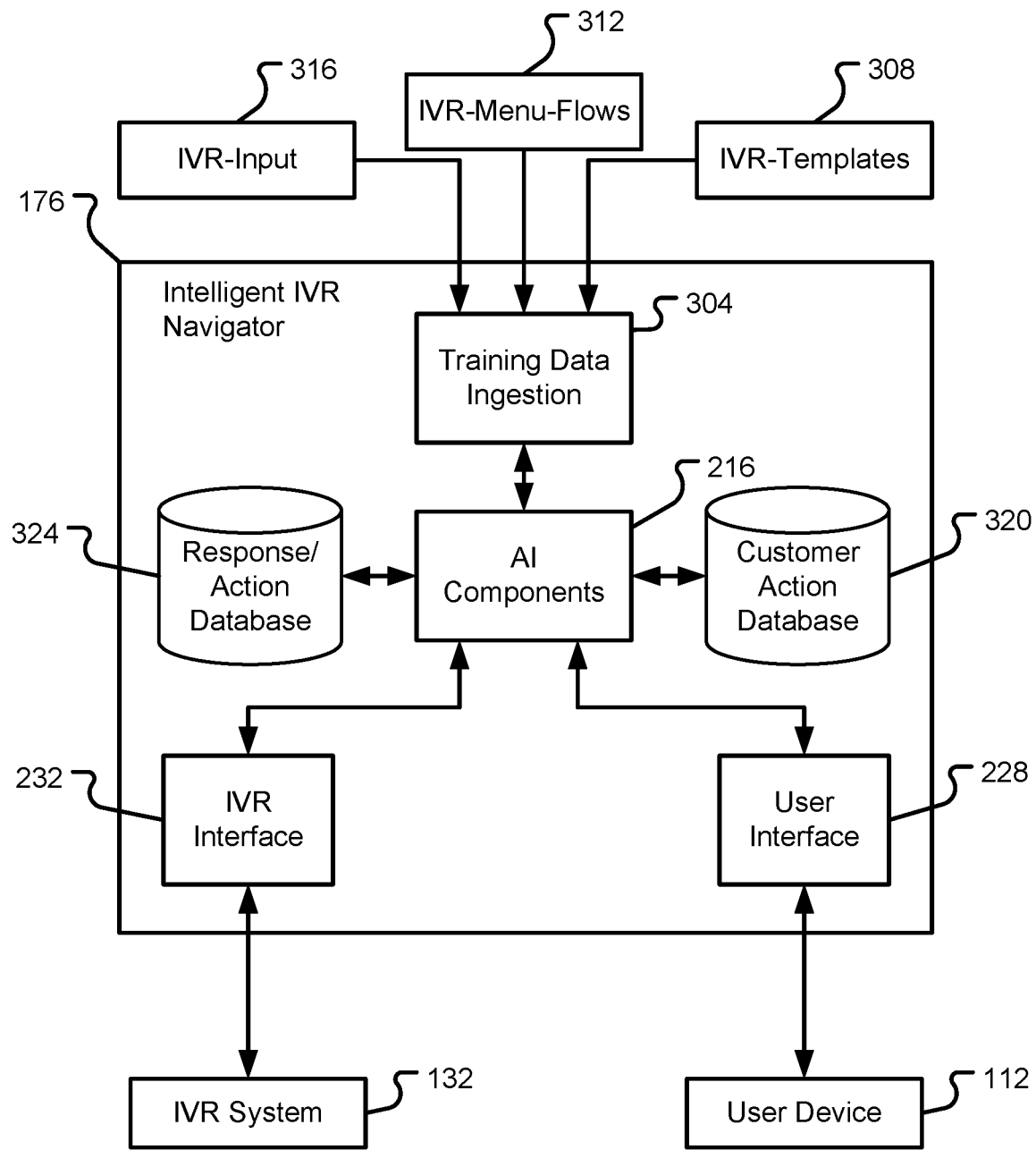
FIG. 3 is a block diagram depicting additional details of an Intelligent IVR Navigator in accordance with at least some embodiments of the present disclosure.

As shown in FIG. 3, the AI components 216 may be configured to receive training data via training data ingestion 304. The training data received at the training data ingestion 304 may include IVR-templates 308, IVR-menu-flows 312, and IVR-input 316. Some or all of the training data received at the training data ingestion 304 may be received from a particular contact center (e.g., as part of training the Intelligent IVR Navigator 176 to operate with the particular contact center). For example, the IVR-templates 308 may correspond to a training data set that describes the IVR menu structure 148 for the IVR system 132 of the particular contact center 108. The IVR-templates 308 may include a description of different multi-level IVR menus of the type that are routinely used by the entity administering the contact center. The IVR-menu-flows 312 may include sequences of the IVR menu states that will be encountered by a customer 116 calling into the IVR system 132. The IVR-menu-flows 312 may include a mapping of IVR prompts 152 at particular stages or states within the IVR menu structure 146. The IVR-input 316 may include the selection of data that is supplied to the IVR system 132 by a customer 116 to advance each self-service interaction. In this way, the IVR-input 316 may be mapped to any input that can be processed by the input processing 156. In some embodiments, the IVR-input 316 may include a description of inputs acceptable by the IVR system 132 and may include both DTMF inputs as well as spoken or text inputs.

The training data may be used to initially train the AI components 216 including one or more AI models to interact with an IVR system 132 on behalf of a customer 116. As mentioned above, the Intelligent IVR Navigator 176 may include the IVR interface 232 to interact with the IVR system 132 as well as a user interface 228 to interact with the customer 116 via the customer communication device 112, which may also be referred to as a user device 112.

The IVR interface 232 may include one or more Application Programming Interfaces (APIs) that are exposed to the contact center 108 and that facilitate machine-to-machine communications between the AI components 216 and the IVR system 132. In particular, the IVR interface 232 may require the IVR system 132 to provide data in a particular format such that the data can be understood and processed by the AI components 216. Likewise, the IVR interface 232 may provide data outputs to the IVR system 132 in a format that is understandable by the IVR system 132. In some embodiments, the IVR interface 232 may include a DTMF generator, a text communication application, and the like. The AI components 216 may be configured to receive inputs from and provide outputs to the IVR interface 232 for communicating with the IVR system 132.

The user interface 228 may include one or a number of different interfaces that facilitate communications with a customer 116 via their customer communication device 112. The user interface 228 may be configured to provide a mobile interface to a mobile communication device (e.g., an application specifically made for an operating system of the customer communication device 112). Alternatively or additionally, the user interface 228 may comprise a web server that is configured to provide one or more web pages or HTML documents to the customer communication device 112 and receive inputs from the customer 116 via the web pages or HTML documents. Alternatively or additionally, the user interface 228 may be configured to interface with a Personal Assistant (e.g., Siri, Alexa, etc.) that operates on behalf of a customer 116. The Personal Assistant may be provided in the customer communication device 112, but may be configured to interact with the Intelligent IVR Navigator 176 based on commands provided to the Personal Assistant by the customer 116. In this way, the user interface 228 may be configured to specifically interface with one or more different types of Personal Assistants (e.g., by offering an API or the like) in addition to providing a human-to-machine interface for a customer 116.

In addition to initial training, the AI components 216 may also be configured to be trained during operation (e.g., during runtime in which the Intelligent IVR Navigator 176 is interacting with a contact center 108 on behalf of a customer 116). Realtime training of the AI components 216 may be achieved by utilizing customer 116 input received at the user interface 228 describing whether the Intelligent IVR Navigator 176 performed a particular task to satisfaction of the customer 116. To further facilitate continuing learning of the AI components 216, the Intelligent IVR Navigator 176 may be configured to store historical responses and IVR actions in a response/action database 324 as well as historical customer actions in a customer action database 320. The response/action database 324 may store information describing interactions the Intelligent IVR Navigator 176 has with one or many different contact centers 108. The customer action database 320 may be configured to store information describing interactions with a customer 116 as well as customer 116 feedback regarding the performance of the Intelligent IVR Navigator 176. Information from both databases 324 may be used as additional training data to help train operations of the AI components 216 and constantly update any AI models used by the AI components 216. For instance, as the Intelligent IVR Navigator 176 continues interacting with a particular IVR system 132 of a particular contact center 108, the details of such interactions and the customer's 116 responses to those interactions may be used to further train the AI components 216 to interact with the same IVR system 132 and/or to interact differently with other IVR systems 132 of other contact centers 108 operated by different entities. In this way, the Intelligent IVR Navigator 176 may be allowed to apply training data from interactions with one contact center 108 to AI models used to interact with another, different, contact center 108.

Referring now to FIGS. 4-8, various methods of operating the systems 100 and components described therein will be described in accordance with at least some embodiments of the present disclosure. The various methods may be described with reference to particular element or set of elements, but it should be appreciated that embodiments of the present disclosure are not so limited. In particular, any component or set of components depicted or described herein may be configured to perform some or all of the steps described in connection with the various methods. Moreover, the order of operations described in connection with any particular method should not be construed at limiting the method to that particular order of operations. Rather, it should be appreciated that the steps of any method may be performed in any order and may be combined with steps from any other method described herein.

Figure 4:
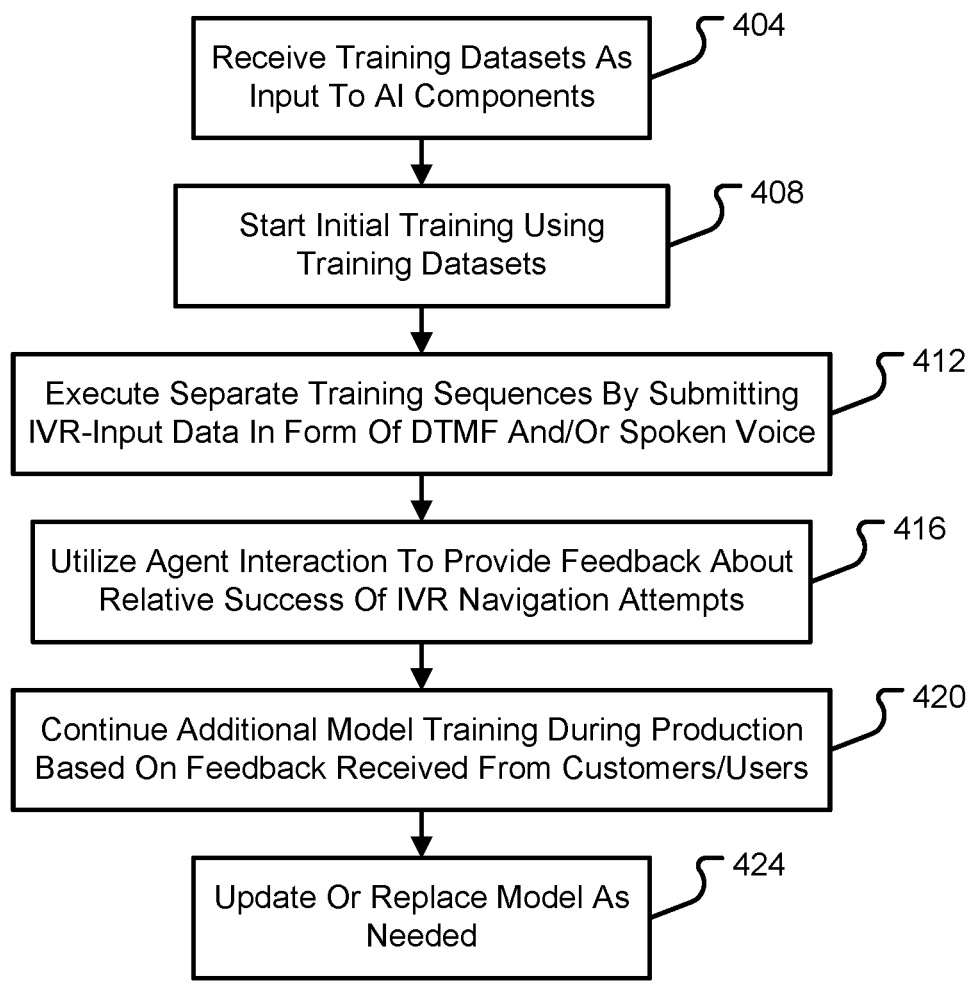
FIG. 4 is a flow diagram depicting a method of initializing and training AI components of an Intelligent IVR Navigator in accordance with at least some embodiments of the present disclosure.

Referring initially to FIG. 4, a method of initializing and training AI components 216 of an Intelligent IVR Navigator 176 will be described in accordance with at least some embodiments of the present disclosure. The method begins with the Intelligent IVR Navigator 176 receiving training datasets as inputs to the AI components 216 (step 404). The training datasets may be received in the form of IVR-templates 308, IVR-menu-flows 312, and/or IVR-input 316 and may be received at the training data ingestion 304. The training datasets may be received for a particular IVR system 132 of a particular contact center 108 or may be received for a more generic IVR system 132 that is common among a number of different contact centers 108.

The method continues by starting an initial training of the AI components 216 using the training datasets received via the training data ingestion 304 (step 408). During initial training, the AI components 216 may execute separate training sequences by submitting IVR-input data to the AI components 216 in the form of DTMF, spoken, and/or text-based inputs (step 412). In particular, the inputs provided to the AI components during initial training may be provided in a format normally used as inputs to an IVR system 132.

The AI components 216 may be trained and behaviors thereof validated based on agent 172 interactions or feedback received (step 416). In particular, one or more agents 172 of the contact center 108 that deploys the IVR system 132 may provide feedback about the relative success of the AI component's 216 automated navigation of the IVR system 132. This feedback may be used to finalize the initial training of the Intelligent IVR Navigator 176 and the AI components 216 thereof for the particular contact center 108. The method may continue by further training the AI components 216 and AI model(s) thereof during production based on feedback received from the customer 116 or user that employed the Intelligent IVR Navigator 176 to interact with the IVR system 132 on behalf of the customer 1116 (step 420).

As the AI components 216 and AI models thereof are continuously updated or trained, the model(s) employed by the AI components 216 for purposes of interacting with the particular IVR system 132 may be updated or replaced as needed (step 424). In particular, if behaviors of the Intelligent IVR Navigator 176 are found to drift away from an acceptable set of behaviors or if more than a predetermined percentage of negative feedback is received from customers 116 during operation of the Intelligent IVR Navigator 176, then one or more model(s) employed by the AI components 216 for interacting with the contact center 108 may be replaced with a new model or updated with new coefficient values.

Figure 5:
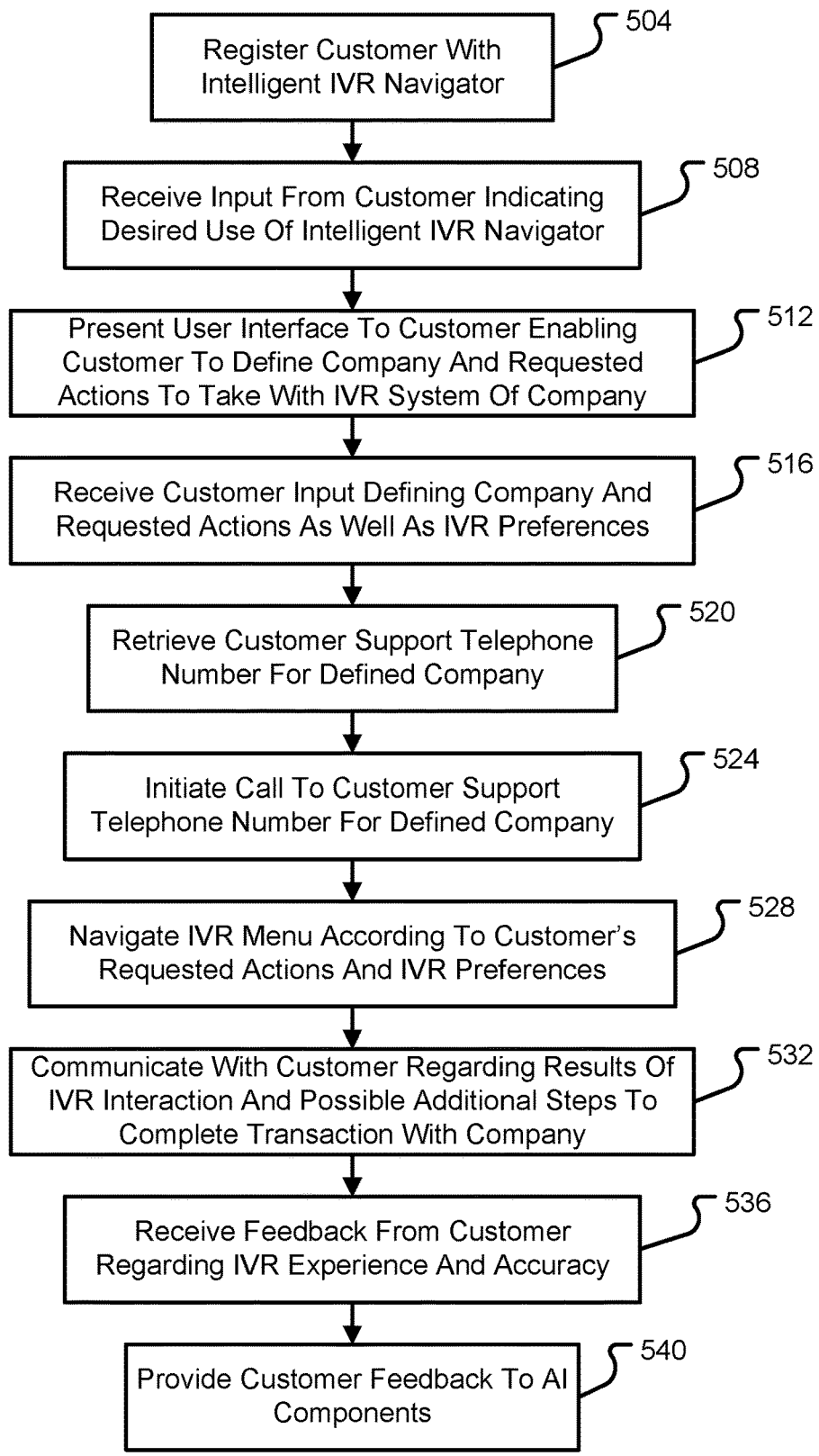
FIG. 5 is a flow diagram depicting a method of operating an Intelligent IVR Navigator in accordance with at least some embodiments of the present disclosure.

Referring now to FIG. 5, a method of operating an Intelligent IVR Navigator 176 will be described in accordance with at least some embodiments of the present disclosure. The method begins when a customer 116 registers either themselves or their customer communication device 112 with the Intelligent IVR Navigator 176 (step 504). Registration may occur by the customer 116 purchasing access to the Intelligent IVR Navigator 176, downloading an application on their customer communication device 112, or performing some other task that causes the Intelligent IVR Navigator 176 to build a profile for the customer 116. The registration process may also allow the customer 116 to define certain desired uses or behaviors of the Intelligent IVR Navigator 176. Specifically, the customer 116 may provide input to the Intelligent IVR Navigator indicating desired uses, which may include an identification of one or more contact centers 108 the customer 116 would like to access with the Intelligent IVR Navigator 176, an identification of entities the customer 116 would like to utilize the Intelligent IVR Navigator 176, callback numbers associated with the customer 116, other communication mechanisms that can be used to reach the customer 116, and so on (step 508).

During registration and thereafter, the Intelligent IVR Navigator 176 may present a user interface to the customer 116 that enables the customer 116 to define the companies/entities and requested actions to take with an IVR system 132 of each company (step 512). For instance, the customer 116 may define actions for the Intelligent IVR Navigator 176 to take with all IVR systems 132 or particular actions to take with a particular IVR system 132 or company operating the particular IVR system 132. The actions may include a definition of the type of support desired by the customer 116, whether the support relates to a service or product, an identification of the service or product, whether the support relates to a currently-owned service or product or a desired service or product, customer loyalty information, etc. In some embodiments, options for actions may be provided to the customer 116 based on the Intelligent IVR Navigator's 176 understanding of the IVR menu structure 148 that will be encountered when the Intelligent IVR Navigator 176 contacts the IVR system 132. In other words, if the IVR system 132 presents three options at a first node of the IVR menu structure 148 and then four options underneath each of the three initial options, the Intelligent IVR Navigator 176 will provide action options to the customer 116 that align with the IVR menu structure 148. The options may be presented to the customer 116 in a visual fashion even though the Intelligent IVR Navigator 176 will interact with the IVR system 132 using the inputs required by the IVR system 132 (e.g., DTMF, voice, text-based, etc.).

After the customer has defined the desired actions (step 516), the method may continue with the Intelligent IVR Navigator 176 retrieving the relevant customer support telephone number for the company defined by the customer 116 (step 520). The Intelligent IVR Navigator 176 may then dial the customer support telephone number to initiate a call to the company's contact center 108 on behalf of the customer 116 (step 524). The call may be initiated immediately after the customer 116 has completed the registration and definition of desired actions for the company or the Intelligent IVR Navigator 176 may be configured to wait for a predetermined or defined amount of time prior to calling the customer support telephone number. The amount of time that the Intelligent IVR Navigator 176 waits to dial the customer support telephone number may be defined by the customer 116 in step 512 or may be programmatically determined by the Intelligent IVR Navigator 176 based on other inputs.

After initiating the call, the Intelligent IVR Navigator 176 may then navigate the IVR system's 132 IVR menu according to the customer's 116 requested actions and IVR preferences defined in step 512 (step 528). That is to say, the Intelligent IVR Navigator 176 is configured to traverse the IVR system 132 and the IVR menu presented by the IVR system 132 based on inputs previously provided to the Intelligent IVR Navigator 176 prior to the Intelligent IVR Navigator 176 calling the customer support telephone number.

The method may then continue with the Intelligent IVR Navigator 176 communicating with the customer regarding the results of the IVR interaction and any possible additional steps needed by the customer 116 to complete the transaction or self-service process with the company (step 532). The communication between the customer 116 and Intelligent IVR Navigator 176 may occur while the Intelligent IVR Navigator 176 is communicating with the IVR system 132 or after the Intelligent IVR Navigator 176 has hung up on the IVR system 132. The communication may take place using any communication channel (e.g., voice, video, text, chat, application, etc.).

The method may further continue by receiving feedback from the customer 116 at the Intelligent IVR Navigator 176 that defines the customer's 116 opinion of the IVR experience and whether the Intelligent IVR Navigator 176 performed the requested actions in conformity with the customer's 116 preferences (step 536). Customer 116 feedback may be used to continuously update or train the AI components 216 of the Intelligent IVR Navigator 176. The training may be applied to the AI components 216 responsible for interacting with the particular IVR system 132 that was just contacted or the training may be applied to other AI components 216 that were not used to interact with the particular IVR system 132 (step 540).

Figure 6:
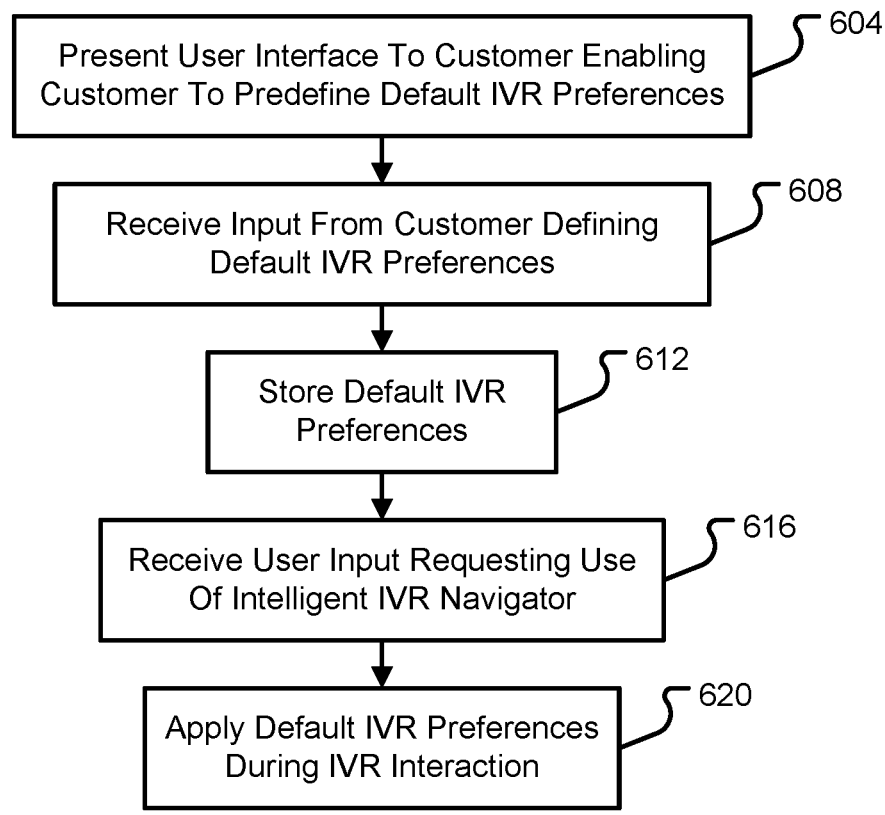
FIG. 6 is a flow diagram depicting a method of enabling a user to define and utilize IVR preferences at an Intelligent IVR Navigator in accordance with at least some embodiments of the present disclosure.

Referring now to FIG. 6, a method of enabling a customer 116 to define and utilize IVR preferences at an Intelligent IVR Navigator 176 will be described in accordance with at least some embodiments of the present disclosure. The method begins with the Intelligent IVR Navigator 176 presenting a user interface 228 to the customer 116 that enables the customer 116 to define or predefine one or more default IVR preferences (step 604). As an example, the customer 116 may define one or more actions that will generically apply to any number of different IVR systems 132. Examples of such actions may include whether the customer 116 desires a callback from the IVR system 132, communication preferences (e.g., defined times of availability/unavailability, defined communication channels, notification preferences, etc.), whether to utilize a particular name/alias for the customer 116, language preferences, and so on.

The user interface 228 may be presented to the customer 116 via a web page, via an application operating on the customer communication device 112, or via any other method suitable to the customer's 116 preferences and capabilities of the customer communication device 112. The method continues with the Intelligent IVR Navigator 176 receiving input from the customer defining one or more default IVR preferences (step 608). The inputs received from the customer may be stored in memory 212 along with other profile information for the customer 116 (step 612). Thereafter, when the Intelligent IVR Navigator 176 is invoked to interact with an IVR system 132 on behalf of the customer 116 (step 616), the Intelligent IVR Navigator 176 can access the default IVR preferences and apply the default IVR preferences along with any other preferences or actions defined by the customer 116 that are different from or supplement the default IVR preferences (step 620). If additional actions are received from the customer that contradict one or more default IVR preferences, the Intelligent IVR Navigator 176 may notify the customer 116 of the contradiction and request that the customer 116 define a desired action for a particular IVR interaction to resolve the contradiction.

Figure 7:
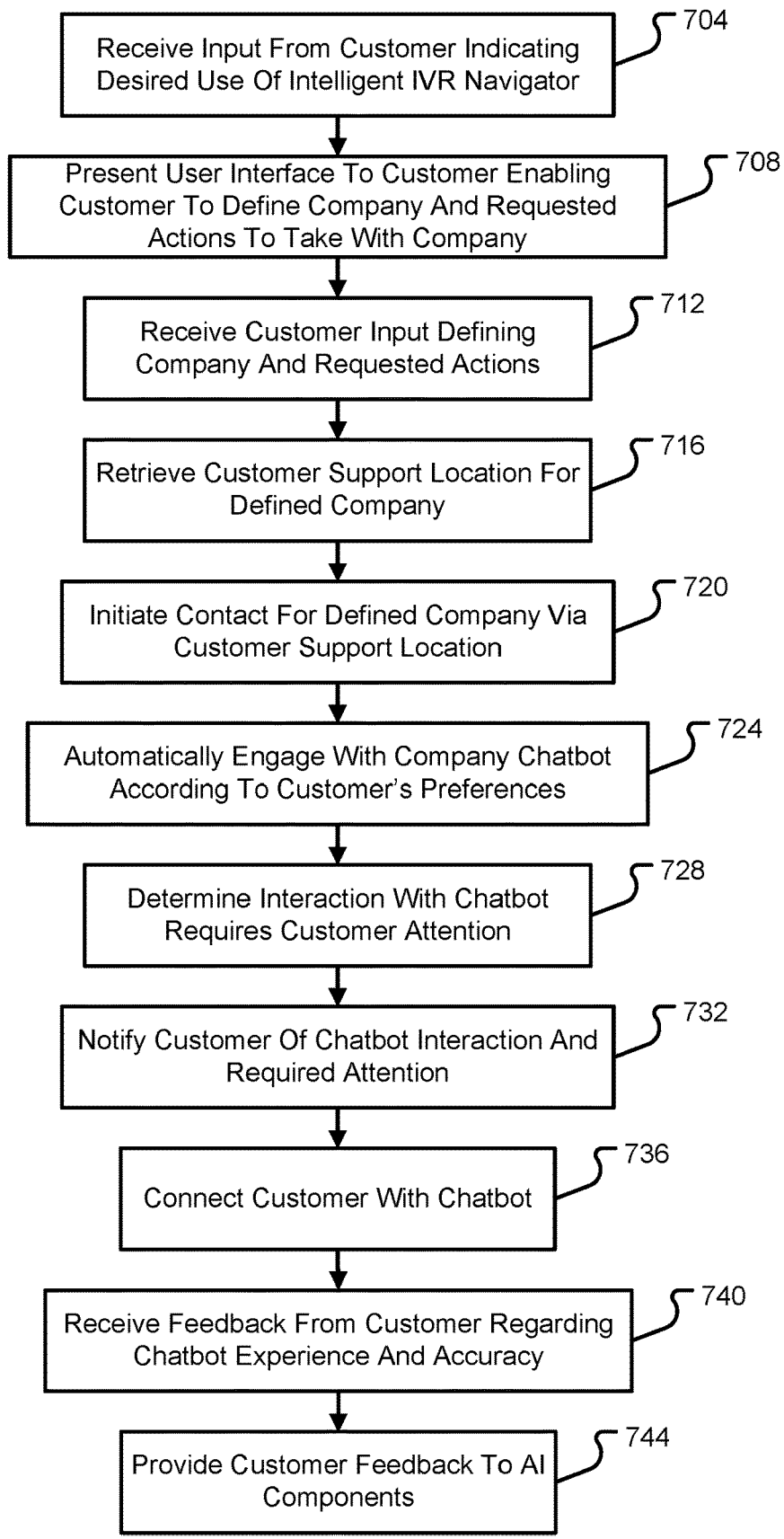
FIG. 7 is a flow diagram depicting another method of operating an Intelligent IVR Navigator in accordance with at least some embodiments of the present disclosure.

With reference now to FIG. 7, another method of operating an Intelligent IVR Navigator 176 will be described in accordance with at least some embodiments of the present disclosure. The method begins after registration when the customer 116 provides input to the Intelligent IVR Navigator indicating desired uses, which may include an identification of one or more contact centers 108 the customer 116 would like to access with the Intelligent IVR Navigator 176, an identification of entities the customer 116 would like to utilize the Intelligent IVR Navigator 176, callback numbers associated with the customer 116, other communication mechanisms that can be used to reach the customer 116, and so on (step 704).

The Intelligent IVR Navigator 176 may present a user interface to the customer 116 that enables the customer 116 to define the companies/entities and requested actions to take with an IVR system 132 of each company (step 708). For instance, the customer 116 may define actions for the Intelligent IVR Navigator 176 to take with all automated self-service systems of a contact center 108 or particular actions to take with a particular self-service system or company operating the particular self-service system. The actions may include a definition of the type of support desired by the customer 116, whether the support relates to a service or product, an identification of the service or product, whether the support relates to a currently-owned service or product or a desired service or product, customer loyalty information, etc. In some embodiments, options for actions may be provided to the customer 116 based on the Intelligent IVR Navigator's 176 understanding of the IVR menu structure 148 or steps that will be encountered during interactions with the contact center's 108 self-service system. In other words, if the self-service system is known to include a chatbot that traverses a particular set of options, the Intelligent IVR Navigator 176 will provide action options to the customer 116 that align with the particular set of options. The options may be presented to the customer 116 in a visual fashion even though the Intelligent IVR Navigator 176 will interact with a self-service system using the inputs required by the self-service system (e.g., text-based inputs for interacting with a chatbot over an asynchronous communication channel).

After the customer has defined the desired actions (step 712), the method may continue with the Intelligent IVR Navigator 176 retrieving the relevant address, web address, SMS number, or contact information for the company defined by the customer 116 (step 716). The Intelligent IVR Navigator 176 may then use the address or defined location to initiate contact with the company's contact center 108 on behalf of the customer 116 (step 720). The contact may be initiated immediately after the customer 116 has defined the desired actions for the company or the Intelligent IVR Navigator 176 may be configured to wait for a predetermined or defined amount of time prior to contacting the company. The amount of time that the Intelligent IVR Navigator 176 waits to contact the company may be defined by the customer 116 in step 712 or may be programmatically determined by the Intelligent IVR Navigator 176 based on other inputs.

After initiating the contact, the Intelligent IVR Navigator 176 may then automatically interact with the company's self-service system (e.g., a chatbot) according to the customer's 116 requested actions and preferences defined in step 712 (step 724). That is to say, the Intelligent IVR Navigator 176 is configured to receive messages from the self-service system and then automatically respond to those messages on behalf of the customer 116 without necessarily requiring input from the customer 116.

The method may then continue with the Intelligent IVR Navigator 176 determining that interactions with the self-service system requires some level of customer 116 attention (step 728). For instance, the Intelligent IVR Navigator 176 may determine that the conversation with the self-service system has stalled or determine that the self-service system is confused or providing the same messages repeatedly in response to inputs provided by the Intelligent IVR Navigator 176. For instance, the Intelligent IVR Navigator 176 may be trained to recognize that a chatbot is stuck in a logic loop or cannot meaningfully respond to a message transmitted by the Intelligent IVR Navigator 176. When the conversation has stalled, the Intelligent IVR Navigator 176 may notify the customer of the interaction and the need for attention from the customer 116 (step 732). The customer 116 may then be connected directly to the self-service system, thereby enabling the customer 116 to interact with the self-service system, picking up where the Intelligent IVR Navigator 176 left off in the conversation (step 736). In some embodiments, the customer 116 may be joined to the conversation between the Intelligent IVR Navigator 176 and the self-service system of the contact center 108 (e.g., added as an additional participant to the conversation). In some embodiments, the customer 116 may be provided with the last few messages exchanged between the Intelligent IVR Navigator 176 and the self-service system along with a link or instructions for joining the conversation or starting a new conversation between the customer 116 and contact center 108, but with reference to the previous conversation between the Intelligent IVR Navigator 176 and contact center 108.

The method may further continue by receiving feedback from the customer 116 at the Intelligent IVR Navigator 176 that defines the customer's 116 opinion of the experience and whether the Intelligent IVR Navigator 176 performed the requested actions in conformity with the customer's 116 preferences (step 740). Customer 116 feedback may be used to continuously update or train the AI components 216 of the Intelligent IVR Navigator 176. The training may be applied to the AI components 216 responsible for interacting with the particular self-service system that was just contacted or the training may be applied to other AI components 216 that were not used to interact with the particular self-service system (step 744).

Figure 8:
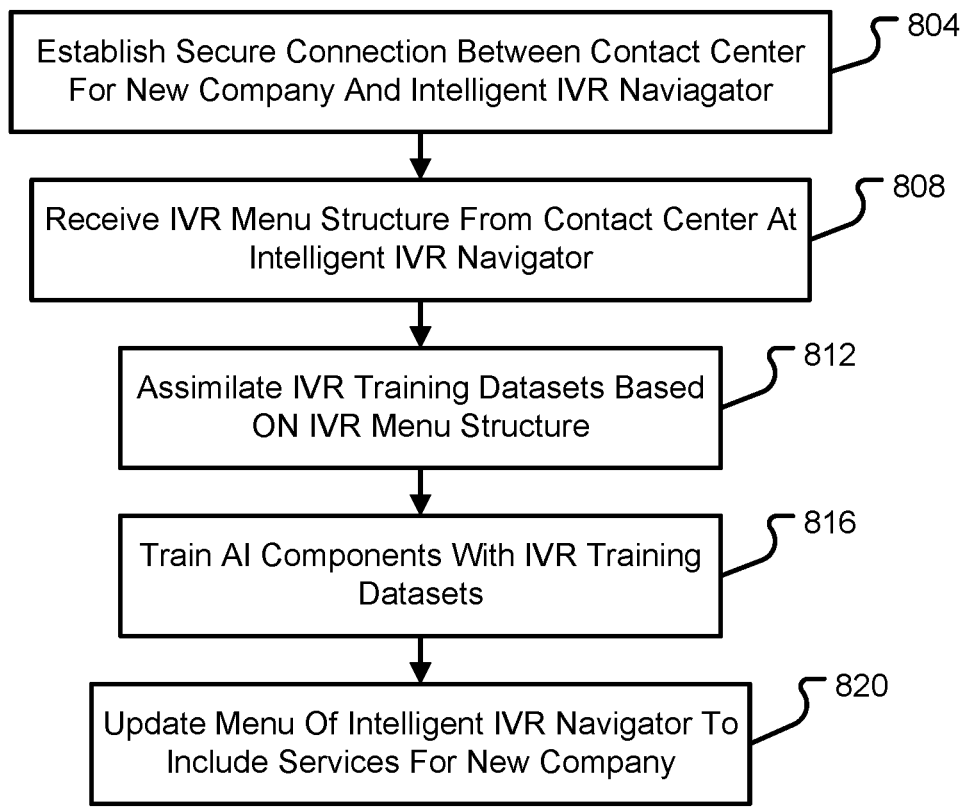
FIG. 8 is a flow diagram depicting a method of enabling an Intelligent IVR Navigator to interact with a new IVR system in accordance with at least some embodiments of the present disclosure.

Referring now to FIG. 8, a method of enabling an Intelligent IVR Navigator 176 to interact with a new IVR system 132 will be described in accordance with at least some embodiments of the present disclosure. The method begins by establishing a secure connection (e.g., communication channel) between the contact center 108 of a new company and the Intelligent IVR Navigator 176 (step 804). The secure communication channel may be used by the contact center 108 to share the IVR menu structure 148 with the Intelligent IVR Navigator 176 (step 808). The contact center 108 may also provide other information used to interact with the IVR system 132, such as IVR prompts 152, input processing 156 and the IVR logic 160. Moreover, if historical responses 164 have been stored by the contact center 108, then the historical responses 164 of customers 116 interacting with the IVR system 132 may also be provided to the Intelligent IVR Navigator 176.

The information received from the contact center 108 at the Intelligent IVR Navigator 176 may then be used to assimilate or build the various IVR training datasets required to initially train the Intelligent IVR Navigator 176 based on the specific IVR menu structure 148 for the IVR system 132 (step 812). The training datasets may include IVR-templates 308, IVR-menu-flows 312, and/or IVR-inputs 316.

The method continues with the Intelligent IVR Navigator 176 training one or more of its AI components 216 (and possibly one or more AI models) with the IVR training datasets (step 816). In some embodiments, the Intelligent IVR Navigator 176 may be configured to obtain a copy of AI components 216 used to interact with another, different, IVR system 132. The AI components 216 may have one or more layers of nodes stripped therefrom and then the modified AI components 216 may be trained with the new training dataset. In this way, a proven AI component 216 can be leveraged for use with the new IVR system 132, but the training of the AI component 216 can be specifically tailored to the new IVR system 132.

After the Intelligent IVR Navigator 176 has been updated to support the new IVR system 132 (e.g., AI components 216 have been trained on the IVR system 132), the method may continue with the Intelligent IVR Navigator 176 updating its menu to indicate that services can be provided for the new IVR system 132 and the company that provides the new IVR system 132 (step 820).

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of interacting with a self-service system of a contact center, the method comprising:
    receiving one or more inputs from a customer, wherein the one or more inputs define a desired action to take on behalf of the customer with the self-service system;
    storing, in memory, the desired action to take on behalf of the customer;
    obtaining contact information for the self-service system;
    using the contact information to automatically establish a communication session with the self-service system;
    receiving a prompt from the self-service system;
    in response to receiving the prompt, accessing the memory; and
    performing the desired action as a response to the prompt, wherein the desired action is performed during the communication session on behalf of the customer, without requiring further customer input.

2. The method of claim 1, further comprising:
    receiving a second prompt from the self-service system;
    determining that the second prompt requires input from the customer; and
    providing the customer with information describing the second prompt along with access to the communication session, thereby enabling the customer to respond to the second prompt.

3. The method of claim 2, further comprising:
    connecting the customer with the communication session by joining a customer communication device with a communication channel that is supporting the communication session.

4. The method of claim 1, further comprising:
    receiving feedback from the customer regarding an accuracy of the desired action being taken in response to the prompt; and
    using the feedback from the customer to train an Artificial Intelligent (AI) component.

5. The method of claim 4, wherein the feedback from the customer is provided as an input to update a model used by the AI component to interact with a different self-service system of a different contact center.

6. The method of claim 4, further comprising:
    obtaining one or more IVR training datasets from the contact center, wherein the one or more IVR training data sets comprise an IVR-templates dataset, an IVR-menu-flows dataset, or an IVR-input dataset; and using the one or more IVR training datasets to initially train the AI component to interact with the self-service system.

7. The method of claim 1, wherein the self-service system comprises an Interactive Voice Response (IVR) system and wherein the desired action is performed by providing an input to the IVR system.

8. The method of claim 7, wherein the input comprises at least one of a Dual-Tone Multi-Frequency (DTMF) input and a voice input.

9. The method of claim 1, wherein the self-service system comprises a chatbot and wherein the desired action is performed by providing a text-based message to the chatbot in response to the prompt.

10. A system, comprising:
a processor; and
a computer memory storing data thereon that enables the processor to:
receive one or more inputs from a customer, wherein the one or more inputs define a desired action to take on behalf of the customer with a self-service system;
store the desired action to take on behalf of the customer;
obtain contact information for the self-service system;
automatically establish a communication session with the self-service system by using the contact information;
receive, during the communication session, a prompt from the self-service system; and
perform the desired action as a response to the prompt, wherein the desired action is performed during the communication session on behalf of the customer, without requiring further customer input.

11. The system of claim 10, wherein the data stored on the computer memory further enables the processor to:
receive a second prompt from the self-service system;
determine that the second prompt requires input from the customer; and
provide the customer with information describing the second prompt along with access to the communication session, thereby enabling the customer to respond to the second prompt.

12. The system of claim 11, wherein the data stored on the computer memory further enables the processor to:
connect the customer with the communication session by joining a customer communication device with a communication channel that is supporting the communication session.

13. The system of claim 10, wherein the data stored on the computer memory further enables the processor to:
receive feedback from the customer regarding an accuracy of the desired action being taken in response to the prompt; and
use the feedback from the customer to train an Artificial Intelligent (AI) component, wherein the feedback from the customer is provided as an input to update a model used by the AI component to interact with a different self-service system of a different contact center.

14. The system of claim 10, wherein the self-service system comprises an Interactive Voice Response (IVR) system, wherein the desired action is performed by providing an input to the IVR system, and wherein the input comprises at least one of a Dual-Tone Multi-Frequency (DTMF) input and a voice input.

15. The system of claim 10, wherein the self-service system comprises a chatbot and wherein the desired action is performed by providing a text-based message to the chatbot in response to the prompt.

16. A non-transitory computer-readable medium comprising processor-executable instructions stored thereon, comprising:
instructions that receive one or more inputs from a customer, wherein the one or more inputs define a desired action to take on behalf of the customer with a self-service system;
instructions that obtain contact information for the self-service system;
instructions that automatically establish a communication session with the self-service system by using the contact information;
instructions that receive, during the communication session, a prompt from the self-service system; and
instructions that perform the desired action as a response to the prompt, wherein the desired action is performed during the communication session on behalf of the customer, without requiring further customer input.

17. The non-transitory computer-readable medium of claim 16, wherein the instructions further comprise:
instructions that receive a second prompt from the self-service system;
instructions that determine that the second prompt requires input from the customer; and
instructions that provide the customer with information describing the second prompt along with access to the communication session, thereby enabling the customer to respond to the second prompt.

18. The non-transitory computer-readable medium of claim 16, wherein the instructions further comprise:
instructions that receive feedback from the customer regarding an accuracy of the desired action being taken in response to the prompt; and
instructions that use the feedback from the customer to train an Artificial Intelligent (AI) component, wherein the feedback from the customer is provided as an input to update a model used by the AI component to interact with a different self-service system of a different contact center.

19. The non-transitory computer-readable medium of claim 16, wherein the self-service system comprises an Interactive Voice Response (IVR) system, wherein the desired action is performed by providing an input to the IVR system, and wherein the input comprises at least one of a Dual-Tone Multi-Frequency (DTMF) input and a voice input.

20. The non-transitory computer-readable medium of claim 16, wherein the self-service system comprises a chatbot and wherein the desired action is performed by providing a text-based message to the chatbot in response to the prompt.

* * * * *